US006915020B2

(12) United States Patent
Damera-Venkata et al.

(10) Patent No.: US 6,915,020 B2
(45) Date of Patent: Jul. 5, 2005

(54) GENERATING GRAPHICAL BAR CODES BY HALFTONING WITH EMBEDDED GRAPHICAL ENCODING

(75) Inventors: Niranjan Damera-Venkata, Sunnyvale, CA (US); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 10/027,523

(22) Filed: Dec. 19, 2001

(65) Prior Publication Data

US 2003/0112471 A1 Jun. 19, 2003

(51) Int. Cl.[7] .............................................. G06K 9/36
(52) U.S. Cl. .................... 382/253; 382/100; 358/3.28
(58) Field of Search ................................ 382/166, 251, 382/252, 253, 232–233, 183, 100; 235/494, 469, 462.01, 456; 358/1.9, 1.2, 2.1–3.06, 3.13, 3.14, 3.28; 380/210, 216; 340/5.24, 5.26; 725/31; 348/460; 713/176, 179

(56) References Cited

U.S. PATENT DOCUMENTS

| 5,315,098 | A | * | 5/1994 | Tow ............................ 235/494 |
| 5,946,414 | A | * | 8/1999 | Cass et al. ................... 382/183 |
| 6,000,613 | A | | 12/1999 | Hecht et al. |
| 6,141,441 | A | | 10/2000 | Cass et al. ................... 382/166 |
| 6,655,592 | B2 | * | 12/2003 | Shaked et al. ......... 235/462.01 |

FOREIGN PATENT DOCUMENTS

EP  0493053  7/1992
EP  1158456  11/2001

OTHER PUBLICATIONS

Zhigang Fan, "Dot–to–dot error diffusion," Journal of Electronic Imaging, vol. 2(1) (Jan. 1993).
N. Damera–Venkata and B. L. Evans, "FM Halftoning Via Block Error Diffusion," Proc. IEEE International Conference on Image Processing, Oct. 7–10, 2001, vol. II, pp. 1081–1084, Thessaloniki, Greece.
Niranjan Damera–Venkata et al; "Adaptive Threshold Modulation for Error Diffusion Halftoning" IEEE Transactions on Image Processing IEEE Inc. New York, US vol. 10 No. 1 Jan. 1, 2001 pp. 104–116.

* cited by examiner

Primary Examiner—Amelia M. Au
Assistant Examiner—Ishrat Sherali

(57) ABSTRACT

Systems and methods for generating graphical bar codes (i.e., images that contain inconspicuous graphical modulations that encode embedded information) by halftoning with embedded graphical encoding are described. In one aspect, a graphical bar code is generated by halftoning regions of an original image. The original image regions incorporate errors diffused among regions of the original image and computed based at least in part upon modulations in the graphical bar code corresponding to a graphical encoding of a message. In another aspect, a graphical bar code is decoded by generating a base image having halftone regions representative of an original image. Regions of the base image are compared probabilistically to a set of graphical code words to obtain a sequence of graphical code words corresponding to a graphical encoding of a message. The sequence of graphical code words is decoded to produce a decoded message.

26 Claims, 6 Drawing Sheets

GENERATING GRAPHICAL BAR CODES BY HALFTONING WITH EMBEDDED GRAPHICAL ENCODING

CROSS-REFERENCE TO RELATED APPLICATIONS

This application relates to the following co-pending applications, each of which is incorporated herein by reference:

U.S. patent application Ser. No. 09/579,010, filed May 25, 2000, by Doron Shaked et al., and entitled "A Method and Apparatus for Generating and Decoding a Visually Significant Bar Code;"

U.S. patent application Ser. No. 09/429,515, filed Oct. 28, 1999 by Renato Kresch et al., and entitled "System and Method for Counterfeit Protection;"

U.S. Ser. No. 09/728,292, filed Dec. 1, 2000, by Jonathan Yen et al., and entitled "Authenticable Graphical Bar Codes;"

U.S. patent application Ser. No. 09/578,843, filed May 25, 2000, by Doron Shaked et al., and entitled "Geometric Deformation Correction Method and System for Dot Pattern Images;"

U.S. Ser. No. 09/877,516, filed on Jun. 7, 2001, by Doron Shaked et al., and entitled "Generating and Decoding Graphical Bar Codes;"

U.S. patent application Ser. No. 09/877,581, filed on Jun. 7, 2001, by Jonathan Yen et al., and entitled "Automatically Extracting Graphical Bar Codes;"

U.S. patent application Ser. No. 09/877,517, filed on Jun. 7, 2001, by Doron Shaked et al., and entitled "Fiducial Mark Patterns for Graphical Bar Codes;"

U.S. patent application Ser. No. 09/975,278, filed on Oct. 10, 2001, by Doron Shaked et al., and entitled "Graphically Demodulating Graphical Bar Codes Without Foreknowledge of the Original Unmodulated Base Image;" and U.S. patent application Ser. No. 09/935,457, filed on Aug. 23, 2001, by Niranjan Damera-Venkata, and entitled "System and Method for Embedding Information within a Printed Image Using Block Error Diffusion Halftoning."

TECHNICAL FIELD

This invention relates to systems and methods of generating graphical bar codes by halftoning with embedded graphical encoding.

BACKGROUND

Digital halftoning (or spatial dithering) is the method of rendering the illusion of continuous tone pictures in an arrangement of binary picture elements. In the case of rendering a continuous tone image with a digital output device, such as an ink jet printer or a laser printer, digital halftoning involves simulating the continuous tone image with groups or cells of dots.

In general halftoning involves generating a binary, or two-tone, image from a continuous tone, or contone or grayscale, image. Grayscale images are continuous tone black (or some other single color) and white images, whereas contone images may be either full color images or monochrome images. In either case, a halftone image is generated from a contone (full color or grayscale) image using any one of a variety of halftoning techniques, including threshold arrays or dithering (e.g., clustered dots, dispersed dots and stochastic screens), adaptive processes (e.g., error diffusion), and interactive processes (e.g., least squares and direct binary search).

Many different methods for embedding information into an image have been proposed.

For example, bar coding is a well-known category of document or image marking techniques for densely encoding digital information in a small image space without regard to how visible the encoded information is to a human viewer. A bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Data glyph technology is another category of information embedding techniques that is particularly advantageous for use in image applications that require a high density rate of embedded data and require the embedded data to be robust with respect to decoding. Data glyph technology encodes digital information in the form of binary 1's and 0's that are then rendered in the form of distinguishable shaped marks such as very small linear marks. Generally, each small mark represents a digit of binary data, and the linear orientation of the particular mark determines whether the particular digit is a digital 1 or 0.

Other document or image marking techniques have been proposed for embedding information in an image so that the information substantially is imperceptible to a human viewer (i.e., in a manner that simultaneously minimizes image distortion caused by embedding the information) while permitting reliable decoding of the information. For example, many different digital watermarking techniques have been proposed. In general, a digital watermark is designed to produce an embedded signal that is imperceptible to a human viewer so as not to diminish the commercial quality and value of the image being watermarked, while producing an embedded signal that is resistant to tampering.

In another approach, U.S. Pat. No. 6,141,441 discloses a technique for decoding message data that has been encoded into a printed color image as a series of small image regions (referred to as "signal cells") that carry the encoded message. Each signal cell is composed of a spatial pattern of colored subregions that collectively have an overall average color. The colors of the subregions are defined as changes (modulations) to the average color in one or more directions in a multi-dimensional color space. The decoding technique uses a set of valid signal blocks, each of which is a unique pattern of color modulated subregions. There is a valid signal block for each valid message value defined in the coding scheme. The decoding operation first locates the positions of the signal cells in the acquired image and then subtracts the local average color of each signal cell from the cell to produce a received signal block. The decoding operation determines the respective valid signal block corresponding to each of the received signal blocks by comparing each valid signal block to each received signal block. One implementation of the decoding technique decodes signal cells that have been arranged in the acquired image in a 2D array by synchronizing an imaginary grid-like structure with the most likely position of all of the signal cells. In one embodiment, a color space direction is selected for the color modulations that results in the differently colored subregions of a signal cell being substantially imperceptible to a human viewer, thus making the pattern that carries the message substantially imperceptible in an encoded image.

SUMMARY

The invention features systems and methods for generating graphical bar codes by halftoning with embedded graphical encoding. As used herein, the term "graphical bar code" broadly refers to an image that contains inconspicuous graphical modulations that encode embedded information. By performing graphical encoding within the halftoning process, the invention enables the visual appearance of the resulting graphical bar codes to be improved without sacrificing the information embedding capacity of the graphical bar codes.

In one aspect, the invention features a method of generating a graphical bar code. In accordance with this inventive method, regions of an original image are halftoned. The original image regions incorporate errors diffused among regions of the original image and computed based at least in part upon modulations in the graphical bar code corresponding to a graphical encoding of a message.

Embodiments in accordance with this aspect of the invention may include one or more of the following features.

Halftoning may comprise computing quantization errors for respective regions of the graphical bar code. In some embodiments, the computed quantization errors are invariant to the graphically encoded message. Average block errors may be diffused among regions of the original image.

In some embodiments, halftoning comprises modifying original image regions with diffused errors to produce corresponding regions of a modified original image. A matrix-valued error filter may be applied to compute quantization errors to be diffused. Quantization errors may be computed based at least in part upon a comparison of regions of the modified original image with corresponding regions of the graphical bar code. Regions of the modified original image may be quantized to produce corresponding regions of a base image. Quantizing may comprise thresholding regions of the modified original image. Regions of the modified original image may be thresholded at an intermediate gray level. In some embodiments, quantizing comprises assigning to regions of the base image respective representative quantized regions selected from a subset of possible representative halftone regions. The subset of possible representative quantized regions may consist of an all-dark representative quantized region and an all-bright representative quantized region. Regions of the base image may be modulated with a graphical encoding of the message to produce corresponding regions of the graphical bar code.

In some embodiments, a sequence of graphical code words corresponding to a graphical encoding of the message may be generated. Halftoning may comprise generating regions of a base image based upon propagation of errors to corresponding regions of the original image. Regions of the base image may be modulated based upon the sequence of graphical code words to produce corresponding regions of the graphical bar code. In some embodiments, modulating base image regions comprises applying an invertible graphical operation between regions of the base image and graphical code words.

One or more of the graphical code words may be non-information-encoding and the remaining graphical code words may be information-encoding. Information-encoding graphical code words and non-information encoding graphical code words may be distinguishable on the basis of average gray value. For example, information-encoding graphical code words may have gray values within a selected gray value range. In some embodiments, one or more non-information encoding graphical code words do not encode modulations into the graphical bar code during encoding. One or more non-information encoding graphical code words may visually enhance regions of the graphical bar code when encoded.

The invention also features a computer program for generating a graphical bar code in accordance with the above-described encoding method.

In another aspect, the invention features a method of decoding a graphical bar code. In accordance with this inventive method, a base image having halftone regions representative of an original image is generated. Regions of the base image are compared probabilistically to a set of graphical code words to obtain a sequence of graphical code words corresponding to a graphical encoding of a message. The sequence of graphical code words is decoded to produce a decoded message.

Embodiments in accordance with this aspect of the invention may include one or more of the following features.

In some embodiments, the base image is generated by halftoning regions of the original image incorporating errors diffused among regions of the original image and computed based at least in part upon modulations in the graphical bar code corresponding to a graphical encoding of a preselected message. The diffused errors preferably are invariant to the graphically encoded message.

In some embodiments, the base image is generated without foreknowledge of the original image. The base image may be generated by measuring one or more intrinsic features of the graphical bar code and, based upon the intrinsic feature measurements, selecting a sequence of halftone regions from a preselected set of halftone regions permitted to represent regions of the original image. In some embodiments selecting the sequence of representative halftone regions comprises selecting a representative halftone region for each region of the graphical bar code likely to match a corresponding region of the base image.

The invention also features a computer program for decoding a graphical bar code in accordance with the above-described decoding method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Overview

Figure 1:
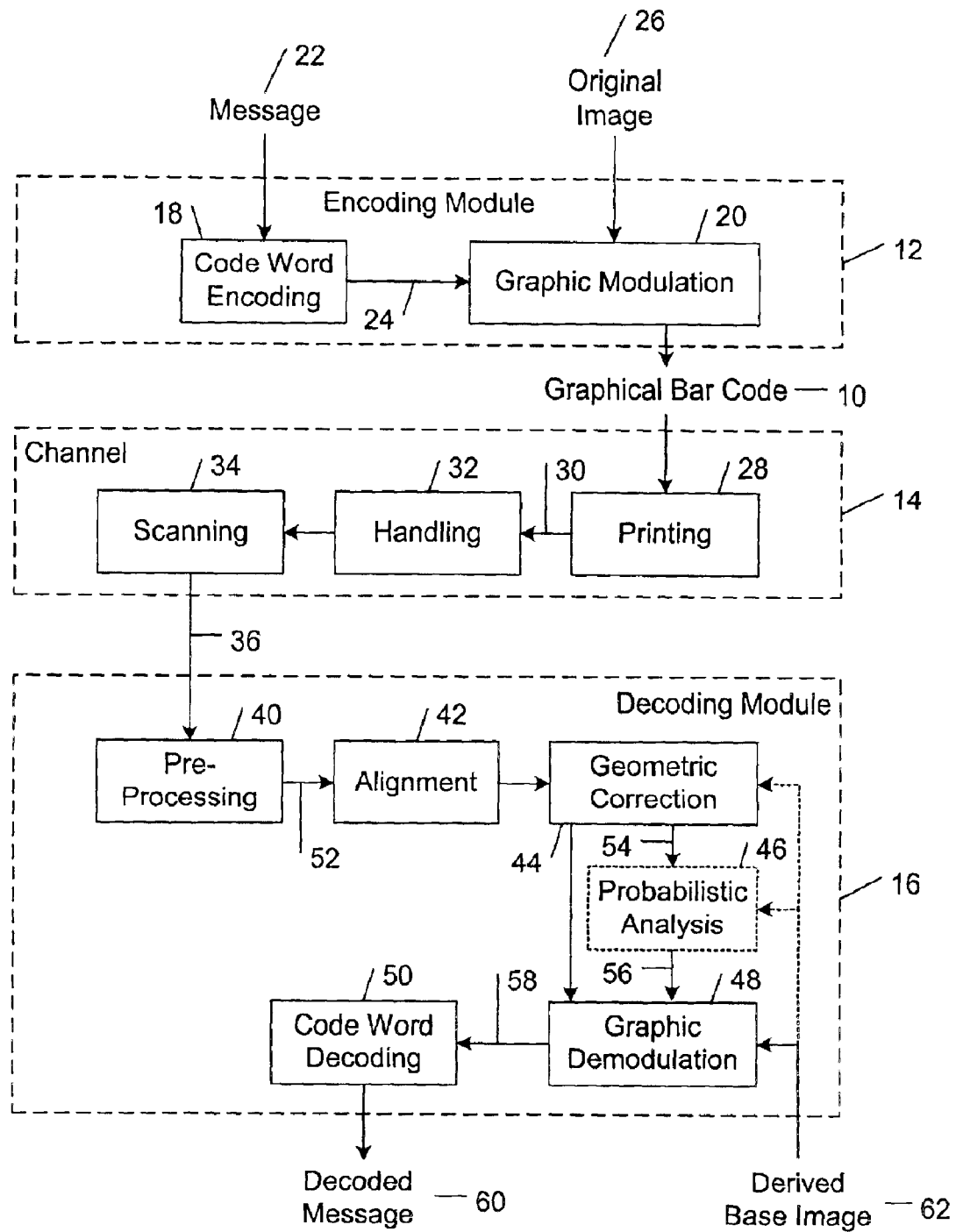
FIG. 1 is a block diagram of an encoding module, a decoding module, and document-handling channel through which one or more graphical bar codes may be transmitted.

Referring to FIG. 1, in one embodiment, a graphical bar code 10 may be generated by an encoding module 12, processed through a document-handling channel 14, and decoded by a decoding module 16.

Encoding module 12 includes a code word encoding stage 18 and a graphic modulation stage 20. Encoding module 12 may be implemented as one or more program modules that are executable on a computer or other programmable processor. In operation, encoding module 12 encodes a message 22 into an encoded message 24. For example, information 22 may be compressed in accordance with a conventional compression algorithm, and encoded with an error correction code. Error correction coding provides robustness to errors due to degradations introduced by document-handling channel 14. The error correction codes also may be interleaved to protect against burst errors. In some embodiments, encoding module 12 may be programmed to generate from information 22 a corroborative signed message in accordance with the encoding process described in U.S. Ser. No. 09/728,292, filed Dec. 1, 2000, by Jonathan Yen et al., and entitled "Authenticable Graphical Bar Codes." During the code word encoding stage 18, the compressed and error correction coded message is translated into an ordered sequence of graphical code words (or templates). During the graphic modulation stage 20, an original image 26 is modulated in accordance with the ordered sequence of graphical code words to produce graphical bar code 10. Original image 26 may be any graphical pattern, including a logo (e.g., a company logo), graphics, pictures, text, images, or any pattern that has visual significance. Message 22 may be embedded in the graphical design of text, pictures, images, borders, or the background of base image 26 to produce graphical bar code 10. Message 22 may be embedded in graphical bar code 10 in the form of a binary image (e.g., a dark and bright dot pattern), a multilevel image (e.g., a gray-level image), or a multilevel color image.

In the document-handling channel 14, graphical bar code 10 may be converted into one or more hard copies 30 by a printing stage 28. Hard copies 30 may be processed through a handling stage 32 before being converted into an electronic scanned image 36 by a scanning stage 34. Graphical bar code 10 may be printed by a conventional printer (e.g., a LaserJet® printer available from Hewlett-Packard Company of Palo Alto, Calif., U.S.A.) or a special-purpose label printing device. Hard copies 30 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. Hard copies 30 may be scanned by a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a digital camera. The scanned graphical bar code image 36 that is acquired by the scanner and introduced into decoding module 16 is a degraded version of the original graphical bar code 10. These degradations may be generated at one or more of the document-handling channel stages, including the printing stage 28, the handling stage 32 (e.g., copying degradations, stains, folds, staples, and markings), and the scanning stage 34.

In general, decoding module 16 includes a pre-processing stage 40, an alignment stage 42, a geometric correction stage 44, an optional probabilistic analysis stage 46, a graphic demodulation stage 48, and a code word decoding stage 50. Decoding module 16 may be implemented as one or more program modules that are executable on a computer or other programmable processor. During the pre-processing stage 40, a scanned graphical bar code image 52 may be located in scanned image 36, and non-bar code regions may be cropped and trimmed from the scanned (or input) image 36. See U.S. patent application Ser. No. 09/877,581, filed on Jun. 7, 2001, by Jonathan Yen et al., and entitled "Automatically Extracting Graphical Bar Codes." During the alignment stage 42, fiducial marks are detected in scanned bar code image 52. The configuration of the detected fiducial marks indicates the type of global deformations that might have been introduced into the graphical bar code during transmission of graphical bar code 10 through document handling channel 14. These global deformations (e.g., translational, rotational, affine and skew distortions) may be corrected during the geometric correction stage 44 as described in U.S. patent application Ser. No. 09/578,843, filed May 25, 2000, by Doron Shaked et al., and entitled "Geometric Deformation Correction Method and System for Dot Pattern Images." During the probabilistic analysis stage 46, in one embodiment, probability models are applied to pixel value measurements to produce a set of probability parameters 56. The probability parameters 56 may be used during the graphic demodulation stage 48 to select the most likely sequence of graphical code words that corresponds to the graphical code word sequence that originally was encoded into original image 26. See U.S. Ser. No. 09/877,516, filed on Jun. 7, 2001, by Doron Shaked et al., and entitled "Generating and Decoding Graphical Bar Codes." The selected graphical code word sequence is translated into an encoded message 58 that is decoded into a decoded message 60 by the code word decoding stage 50. As explained in detail below, in some embodiments, decoding module 16 may be configured to decode scanned graphical bar code 36 automatically without foreknowledge of the original, unmodulated image 26, but rather based upon a derived base image 62.

The systems and methods described herein are not limited to any particular hardware or software configuration, but rather they may be implemented in any computing or processing environment, including in digital electronic circuitry or in computer hardware, firmware or software. The encoding and decoding modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Graphical Encoding

Figure 2A:
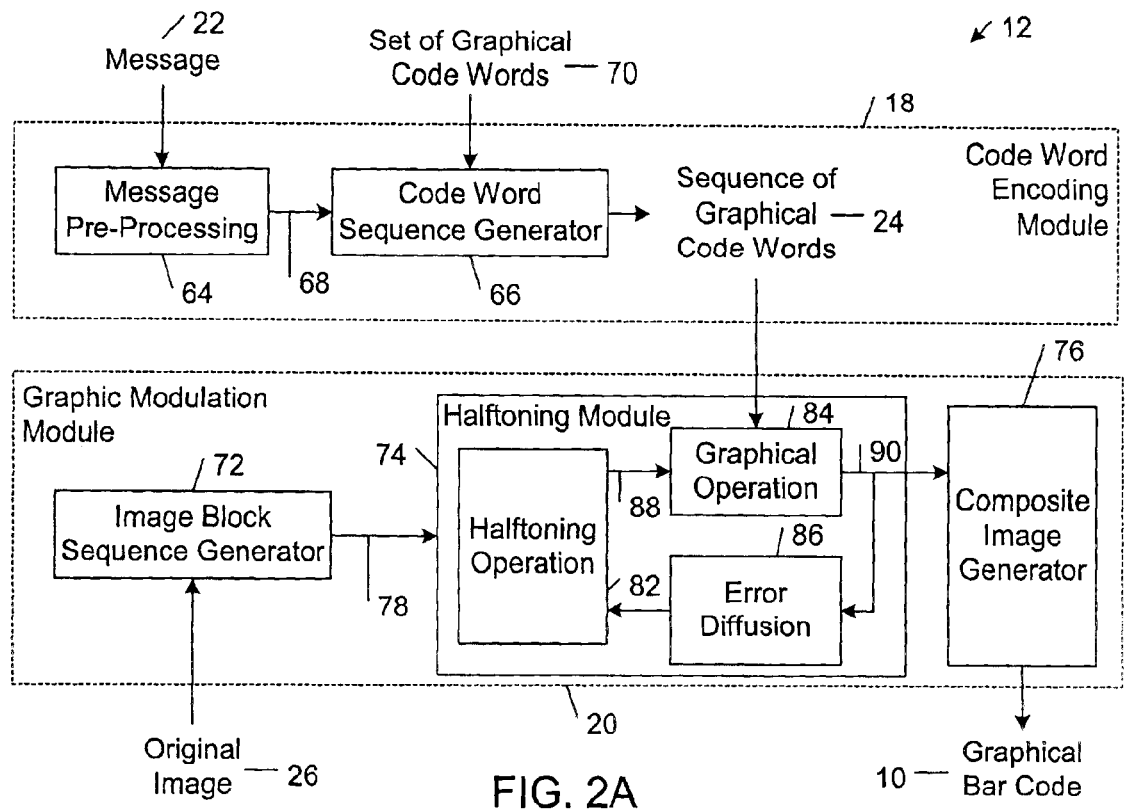
FIGS. 2A and 2B are block diagrams of an encoding module configured to generate from an original image a graphical bar code containing modulations corresponding to a graphical encoding of a message.
Figure 2B:
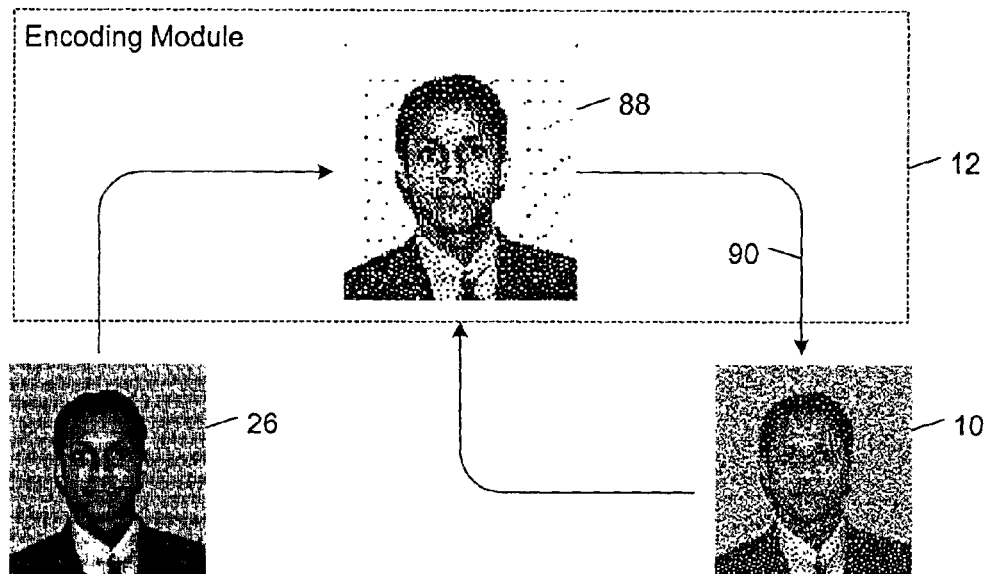

Referring to FIGS. 2A and 2B, in one embodiment, graphical bar code 10 may be produced by graphically modulating original image 26 in accordance with the following graphical encoding process. The message 22 to be encoded is pre-processed by a message pre-processing module 64. Message pre-processing module may be configured to compress message 22 and encode it with an error correction code. In some embodiments, message pre-processing module 64 may be programmed to generate a corroborative signed message from message 22. A code word sequence generator 66 generates the sequence 24 of graphical code words that represents a graphical encoding of the pre-processed message 68 based upon a predefined set of graphical code words 70. The sequence 24 of graphical code words is passed to the graphic modulation module 20 where it will be embedded into original image 26 in the form of inconspicuous graphical modulations.

Graphic modulation module 18 includes an image block sequence generator 72, a halftoning module 74, and a composite image generator 76. Image block sequence generator 72 is operable to partition original image 26 into a plurality of sub-matrices (or sub-images). For example, if original image 26 is an M×N pixel image, it may be partitioned into a regular array of O K×K pixel sub-matrices, where O=M×N/(K×K). Optionally, one or more original image sub-matrices may be reserved for fiducial marks. Un-reserved sub-matrices 78 are passed to halftoning module 74 for conversion into binary bar code matrices 80. The sub-matrices are collected and assembled into graphical bar code 10 by composite image generator 76.

Halftoning module 74 is configured to perform a halftoning operation 82, a graphical operation 84, and a block error diffusion operation 86. The halftoning operation 82 involves generating from the un-reserved sub-matrices 78 corresponding binary blocks of a base image 88. In general, any conventional halftoning operation may be used to generate base image 88 from the un-reserved sub-matrices 78, including any conventional error diffusion, cluster dithering, or thresholding halftoning process, as well as any conventional hybrid halftoning process that combines multiple thresholding processes (see, e.g., Zhigang Fan, "Dot-to-dot error diffusion," Journal of Electronic Imaging, Vol. 2(1) (January 1993)). In one embodiment, the halftoning operation involves thresholding the un-reserved sub-matrices 78 at an intermediate gray level. The graphical operation 84 involves embedding (or encoding) the graphical encoding of message 22 into base image 88. In one graphical encoding embodiment, message 22 may be encoded into the bi-level base image 88 by a two-bit encoding process based upon two-by-two halftone patterns (or matrices). See U.S. patent application Ser. No. 09/579,010, filed May 25, 2000, by Doron Shaked et al., and entitled "A Method and Apparatus for Generating and Decoding a Visually Significant Bar Code." In another graphical encoding embodiment, an invertible graphical operation (e.g., an XOR graphical operation) is applied between the sequence 24 of graphical code words and blocks of base image 88. See U.S. patent application Ser. No. 09/877,516, filed on Jun. 7, 2001, by Doron Shaked et al., and entitled "Generating and Decoding Graphical Bar Codes." A fiducial mark pattern also may be generated to track one or more reference locations and local deformation across the resulting graphical bar code. See U.S. patent application Ser. No. 09/877,517, filed on Jun. 7, 2001, by Doron Shaked et al., and entitled "Fiducial Mark Patterns for Graphical Bar Codes." Errors introduced into the resulting graphical bar code blocks 90 by the graphical encoding operation 84 are fed back to the halftoning operation 82 for diffusion among the unprocessed blocks 78 of original image 26. By performing graphical encoding within the halftoning process, the visual appearance of the resulting graphical bar code 10 may be improved without sacrificing the information embedding capacity of the graphical bar code 10.

Figure 3:
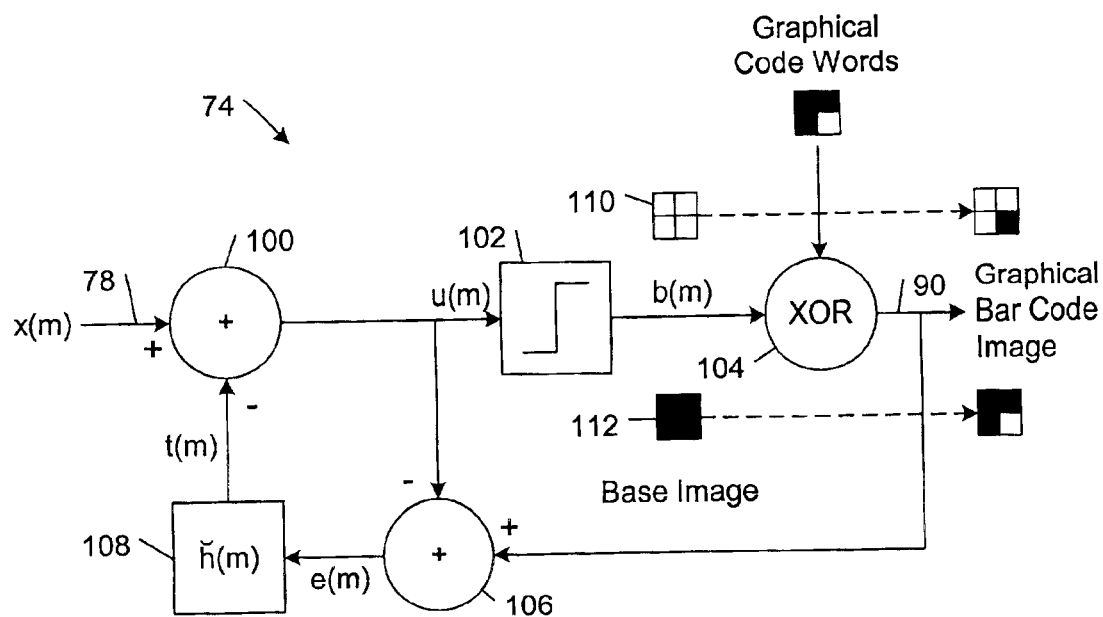
FIG. 3 is a block diagram of a graphic modulation module of the encoding module of FIGS. 2A and 2B.

Referring to FIG. 3, in one embodiment, halftoning module 74 may be implemented as follows. The unprocessed blocks 78 (x(m)) of original image 26 are passed through a summing stage 100, which incorporates diffused errors t(m) into the original image blocks x(m) to produce modified image blocks u(m). The modified image blocks u(m) are halftoned at a thresholding stage 102 to generate the blocks b(m) of base image 88. In particular, at the halftoning stage 102, each modified image block u(m) is assigned a respective representative quantized block that is selected from a subset of possible representative halftone blocks (or regions). For example, in one embodiment, each modified image block u(m) may be represented either by an all-bright pixel block 110 (i.e., a block with all pixels equal to 255) or an all-dark pixel block 112 (i.e., a block with all pixels equal to 0).

At a graphical modulation stage 104, an invertible graphical operation (e.g., an XOR graphical operation) is applied between the graphical code words and the blocks b(m) of base image 88 to produce the corresponding blocks 90 of graphical bar code 10. In general, the invertible graphical operation should generate a mapping (f) from the base image sub-matrices ($BI_i$) and the graphical templates ($T_j$) to the graphical bar code regions ($GBC_i$) that may be inverted (f') to recover graphical templates ($T_j$) from the base image sub-matrices ($BI_i$) and the graphical bar code regions ($GBC_i$). That is, $$f(BI_i, T_j) \rightarrow GBC_i \quad (1)$$

$$f'(BI_i, GBC_i) \rightarrow T_j \quad (2)$$

In one embodiment, the invertible graphical operation corresponds to an XOR graphical operation, which operates on a pair of input pixel values to produce an output pixel value in accordance with the following XOR function:

TABLE 1

XOR Graphical Operation.

| First Input Pixel Value | Second Input Pixel Value | Output Pixel Value |
|---|---|---|
| Dark | Dark | Bright |
| Dark | Bright | Dark |
| Bright | Dark | Dark |
| Bright | Bright | Bright |

At an error computation stage 106, quantization errors e(m) are computed based upon differences between the blocks u(m) of the modified image and the corresponding blocks 90 of graphical bar code 10. The quantization errors e(m) are filtered by a linear error filter 108 to produce the diffused errors t(m). The linear error filter 108 has matrix valued coefficients and operates on the quantization error sequence e(m) to produce the feedback signal sequence t(m) according to:

$$t(m) = \sum_{k \in S} \check{h}(k) e(m-k) \quad (3)$$

where $\check{h}(\cdot)$ is an $N^2 \times N^2$ matrix-valued sequence and S is the filter support. The linear error filter 108 preferably is designed so that the diffused error is invariant to the specific message code word bit pattern at a given block. In the illustrated embodiment, the linear error filter 108 is configured to diffuse the average error. Additional details regarding the block error diffusion process may be obtained from U.S. patent application Ser. No. 09/935,457, filed on Aug. 23, 2001, by Niranjan Damera-Venkata et al., and entitled "System and Method for Embedding Information within a Printed Image Using Block Error Diffusion Halftoning," and from N. Damera-Venkata and B. L. Evans, "FM Halftoning Via Block Error Diffusion," Proc. *IEEE International Conference on Image Processing*, Oct. 7–10, 2001, vol. II, pp. 1081–1084, Thessaloniki, Greece, both of which are incorporated herein by reference.

Figure 4:
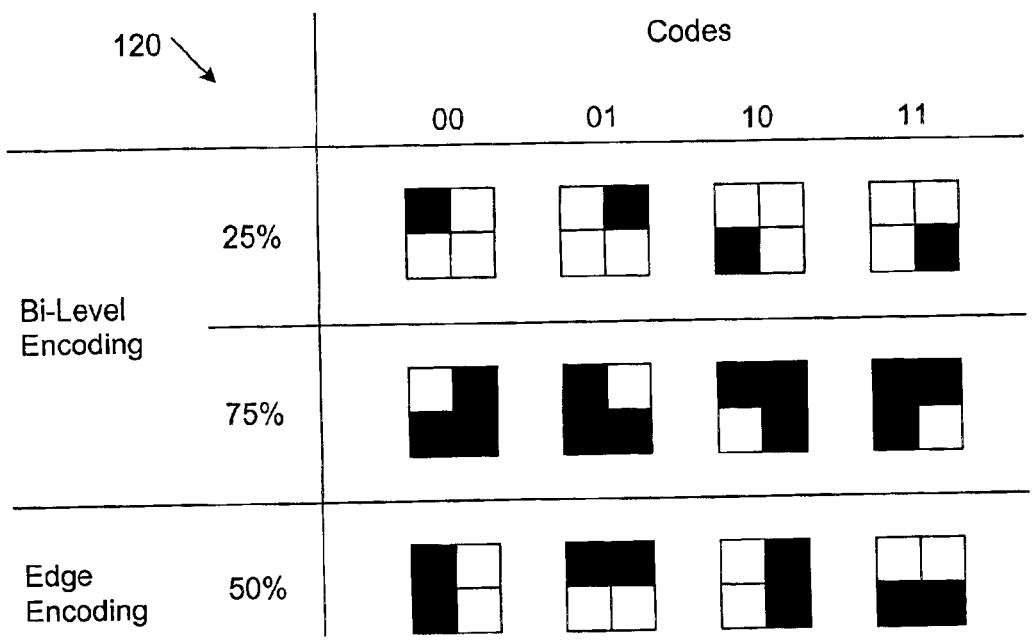
FIG. 4 is a table mapping information to a two-bit graphical code.

As shown in FIG. 4, in one graphical encoding embodiment, message 22 may be encoded into a graphical bar code image based upon a set of graphical templates 120 (or halftone patterns). In this embodiment, the graphical templates 120 are 2×2 pixel patterns corresponding to a subset of the possible arrangements of dark dots in a 2×2 pattern. In other embodiments, all of the possible graphical template patterns may be used for encoding message 22. The top two rows of code words 120 correspond to all of the possible arrangements of a single dark dot or a single white dot in a 2×2 pattern. In some embodiments, fictitious (or non-information encoding) code words that are readily distinguishable from information encoding code words may be used for certain regions of original image 26 to avoid compromising the image quality of the resulting graphical bar code. For example, the last row of code words in FIG. 4 corresponds to code words that may be used during encoding to visually enhance regions of graphical bar code 10 corresponding to fine edge regions of original image 26. In addition, some regions of original image may be encoded with a code word, such as an all-dark pixel code word, which does not encode modulations into the graphical bar code during encoding. In these examples, the information encoding code words have an average gray value of 25% (top row) or 75% (middle row), whereas the edge encoding code words (bottom row) have an average gray value of 50% and the non-modulating code word has an average gray value of 100%. This allows the fictitious code words in these examples to be distinguished from the information encoding code words on the basis of average gray value.

The use of fictitious code words allows the information embedding capacity of the graphical bar code 10 to be traded for image quality. For example, in some embodiments, a fictitious code word may be used whenever the average gray value of a modified image block falls outside of a preselected gray value range. In one embodiment in which the code words of FIG. 4 are used on a grayscale original image, the non-modulating code word (i.e., all-dark code word block) is used whenever $$\frac{1}{N^2}\left(\sum_{i=1}^{N^2} x_i(m)\right) \notin \left[\frac{1}{4}, \frac{3}{4}\right] \forall m \quad (4)$$

where $x_i$ is the gray value of a pixel in an N×N pixel block.

In general, the graphical encoding process of FIG. 4 may be extended to n-bit encoding mappings, where n has an integer value of 1 or greater. For example, in one embodiment, information is encoded by a five-bit encoding process based upon three-by-three halftone patterns. In addition, the template pixels need not be arranged in a regular rectangular array. See U.S. patent application Ser. No. 09/877,516, filed on Jun. 7, 2001, by Doron Shaked et al., and entitled "Generating and Decoding Graphical Bar Codes."

Graphical Decoding

Figure 5A:
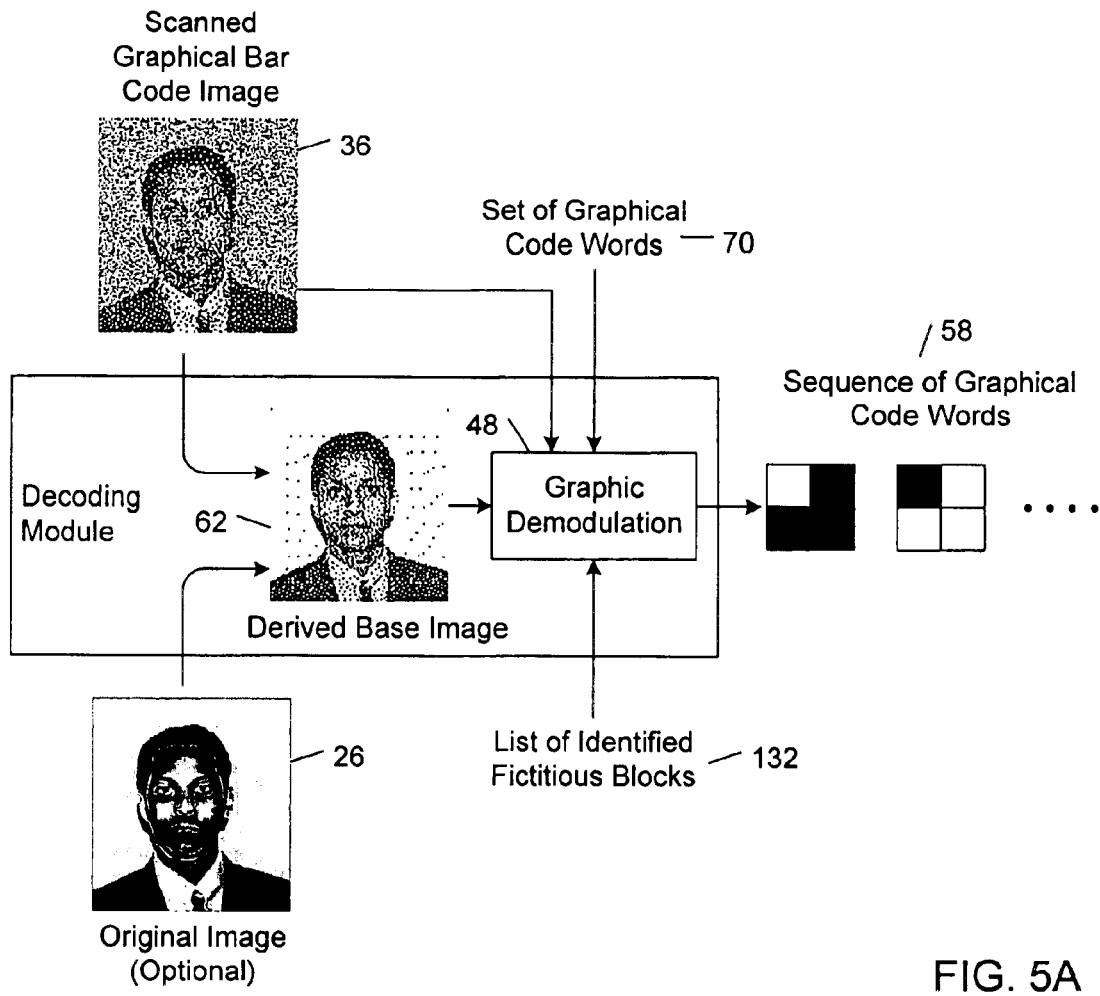
FIGS. 5A and 5B are block diagrams of a decoding module configured to extract a sequence of embedded graphical code words from a graphical bar code.
Figure 5B:
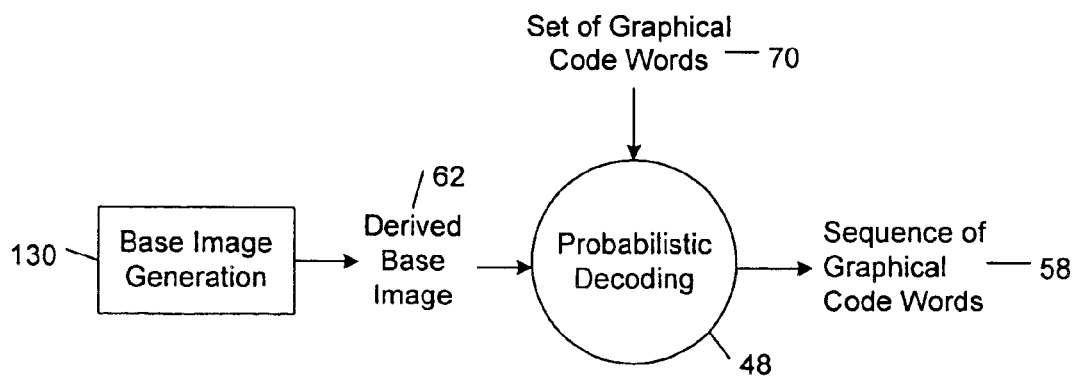

Referring to FIGS. 5A and 5B, in one embodiment, a scanned version 36 of graphical bar code 10 may be decoded as follows. Initially, a base image 62 is generated at a base image generation stage 130. The base image 62 may be derived from the original image 26 if it is available (see the subsection entitled "Guided Decoding"), or the base image 62 may be derived from the scanned graphical bar code 36 (see the subsection entitled "Blind Decoding"). Next, a list 132 of fictitious code word blocks is generated. As explained in detail below, fictitious code word blocks may be identified from the original image 26 (if it is available), or they may be identified based upon the average gray scale values of the scanned bar code image blocks. The derived base image 62 and the list 132 of fictitious code word blocks are passed to the graphic demodulation stage 48. At the graphic demodulation stage 48, the inverted graphical operation described above is used to demodulated regions of the graphical bar code based on corresponding regions of the derived base image 62 and thereby recover the graphical code words embedded in the graphical bar code. The recovered graphical code words are compared probabilistically to each graphical code word in the set of possible graphical code words to obtain a sequence of graphical code words corresponding to a graphical encoding of the message encoded in the original image; during this process regions corresponding to fictitious code words are ignored and not processed. Additional details regarding the probabilistic methodology for decoding code word blocks may be obtained from U.S. patent application Ser. No. 09/877,516, filed on Jun. 7, 2001, by Doron Shaked et al., and entitled "Generating and Decoding Graphical Bar Codes." The resulting sequence 58 of graphical code words may be decoded by code word decoding module 50 to produce decoded message 60 (see FIG. 1).

Guided Decoding

Figure 6A:
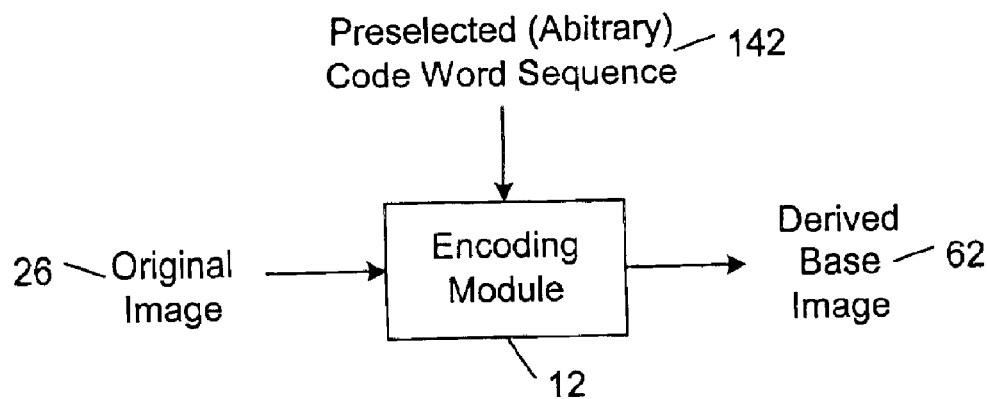
FIG. 6A is a block diagram of an encoding module configured to generate a base image from an original image.
Figure 6B:
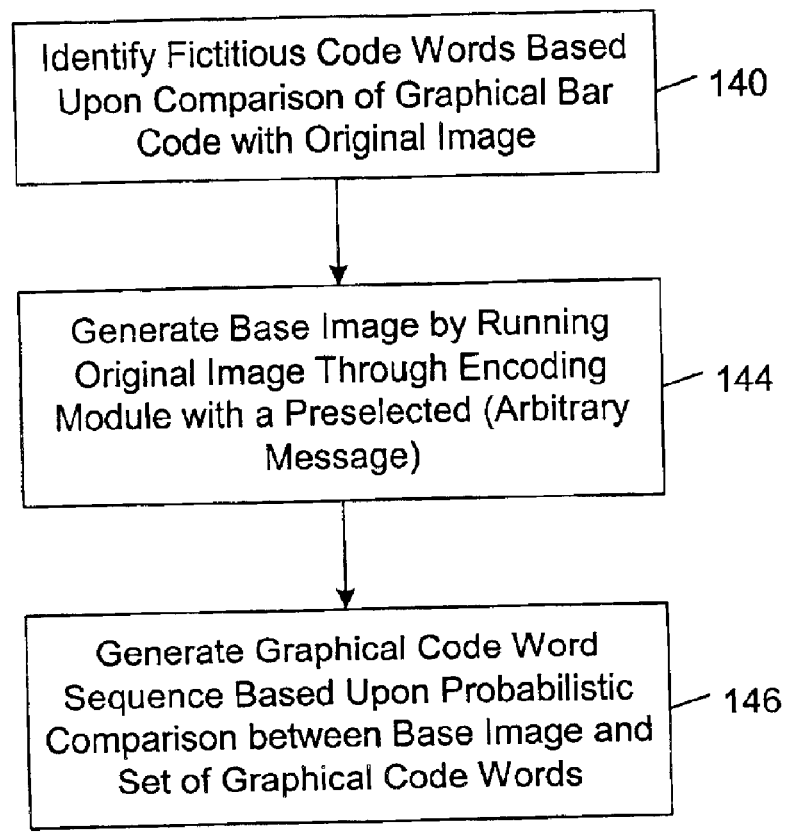
FIG. 6B is a flow diagram of a method of generating a base image from an original image.

Referring to FIGS. 6A and 6B, in one embodiment, if the original image 26 is known and is available, it may be used to derive base image 62 as follows. Fictitious code words are identified direclty from the original image 26 (step 140). For example, if fictitious code words are used in accordance with equation (4), the fictitious code word blocks in the scanned graphical bar code 36 will correspond to the blocks in the original image 26 that have average gray values that fall outside of the permissible code word gray value range. The base image 62 is derived by running the original image through encoding module 12 with a preselected arbitrary message 142 (step 144). As mentioned above, the diffused error is invariant to the specific code word bit pattern at a given block. For example, if all non-fictitious code words have only one white pixel, then by diffusing the average error the feedback is invariant to the message code word. This enables the base image 62 to be derived using any arbitrary message 142. The graphical code word sequence 58 may be generated from the derived base image 62 using the probabilistic graphical decoding process described above (step 146).

Blind Decoding

Figure 7A:
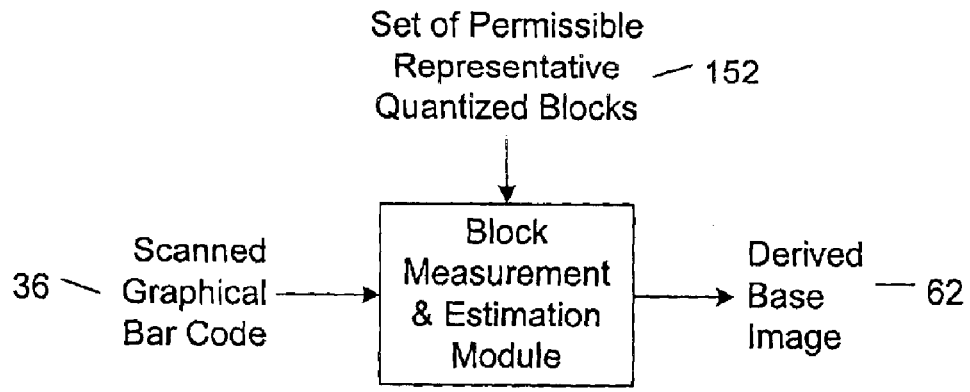
FIG. 7A is a block diagram of a block estimation and measurement module configured to generate a base image from a graphical bar code image.
Figure 7B:
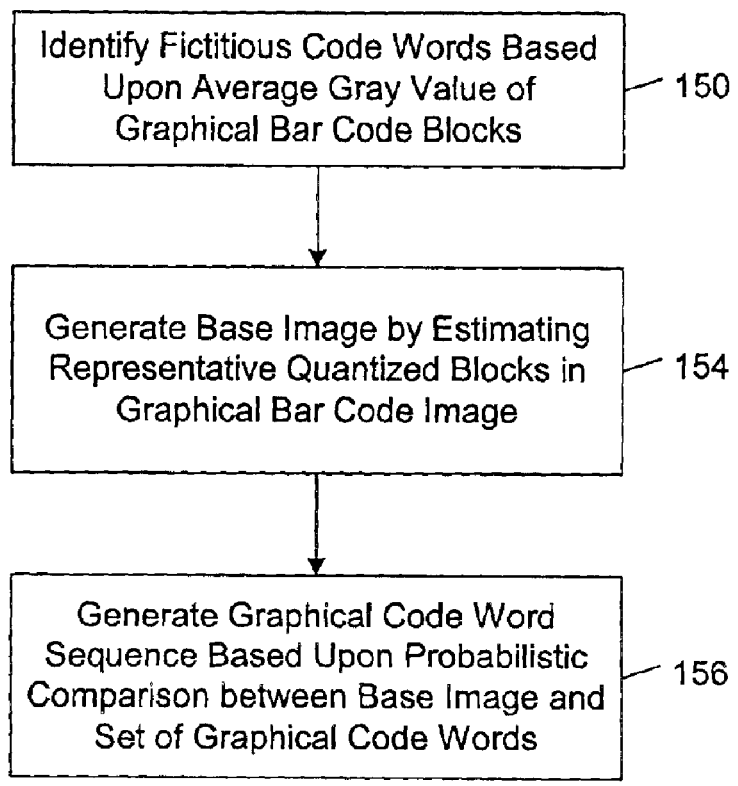
FIG. 7B is a flow diagram of a method of generating a base image from a graphical bar code image.

Referring to FIGS. 7A and 7B, in one embodiment, if the original image 26 is not known or is not available, base image 62 may be derived from the scanned graphical bar code 36 as follows. Fictitious code words in the scanned graphical bar code 36 are identified based upon the average gray value of the graphical bar code blocks (step 150). For example, assuming fictitious code words are used whenever the average gray value of a modified image block falls outside of a predetermined gray value range, the fictitious code word blocks may be identified at the block locations where the average gray value falls outside of that range. Base image 62 is generated by estimating the representative quantized blocks 152 in the scanned graphical bar code image 36 (step 154). Since the number of classes of permissible representative quantized blocks is restricted by design (e.g., either an all-bright block or an all-dark pixel block), the representative quantized blocks may be readily estimated using a probabilistic analysis. For example, a digital grid may be synchronized with the print-scan grid so that a group of scanned pixels corresponds to the encoded halftone pixel block from which the corresponding pixel block of the base image 62 is to be estimated. In this regard, a linear discriminant (e.g., an optimal Fisher discriminant) is applied to the grouped data to reduce the dimensionality. A probabilistic model (e.g., Gaussian mixture model) is fitted to the data using a conventional expectation maximization algorithm. Optimal decision boundaries are chosen using, for example, maximum likelihood or Bayesian criteria. These boundaries separate the possible blocks of the base image 62 into classes. If a code word falls into a fictitious code word class, then that pixel block is marked to be ignored. The graphical code word sequence 58 may be generated from the derived base image 62 using the probabilistic graphical decoding process described above (step 156).

Other Embodiments

Other embodiments are within the scope of the claims.

For example, the above-described embedding strategy may be extended to encode color image barcodes by using a vector extension of the block error diffusion algorithm. Thus, for example, at each step there would by three image blocks (in the RGB case) to be quantized into a block of 8 allowable colors before XOR modulation. Then the color quantization errors may be diffused jointly or separately, taking into account the printer characteristics. More information may be embedded in color images since we could choose a set of three codeword blocks (for the three-color case), one for each color. This means that if 2×2 blocks were used, at most 12 bits could be embedded per 2×2 color image block (although in the interest of image quality and robustness we may restrict this to say 6 bits). This is three times as much information as could be embedded in a grayscale image. To improve image quality for the same embedding bit rate one could allow more code word variations in, for example, the yellow plane. A color scan of the image could be decoded by separating the color planes and by using the above-described decoding process (with parameters modified to fit the statistics of the corresponding color observations) on each of the image planes.

Still other embodiments are within the scope of the claims.

What is claimed is:

1. A method of generating a graphical bar code, comprising:

generating a sequence of graphical code words corresponding to a graphical encoding of a message;

halftoning regions of an original image incorporating errors diffused among regions of the original image and computed based at least in part upon modulations in the graphical bar code corresponding to the graphical encoding of the message, wherein halftoning comprises generating regions of a base image based upon propagation of errors to corresponding regions of the original image; and modulating regions of the base image based upon the sequence of graphical code words to produce corresponding regions of the graphical bar code.

2. The method of claim 1, wherein halftoning comprises computing quantization errors for respective regions of the graphical bar code.

3. The method of claim 2, wherein the computed quantization errors are invariant to the graphically encoded message.

4. The method of claim 3, wherein average block errors are diffused among regions of the original image.

5. The method of claim 1, wherein halftoning comprises modifying original image regions with diffused errors to produce corresponding regions of a modified original image.

6. The method of claim 5, further comprising applying a matrix-valued error filter to compute quantization errors to be diffused.

7. The method of claim 5, wherein quantization errors are computed based at least in part upon a comparison of regions of the modified original image with corresponding regions of the graphical bar code.

8. The method of claim 5, further comprising quantizing regions of the modified original image to produce corresponding regions of the base image.

9. The method of claim 8, wherein quantizing comprises thresholding regions of the modified original image.

10. The method of claim 9, wherein regions of the modified original image are thresholded at an intermediate gray level.

11. The method of claim 8, wherein quantizing comprises assigning to regions of the base image respective representative quantized regions selected from a subset of possible representative halftone regions.

12. The method of claim 11, wherein the subset of possible representative quantized regions consists of an all-dark representative quantized region and an all-bright representative quantized region.

13. The method of claim 1, wherein modulating base image regions comprises applying an invertible graphical operation between regions of the base image and graphical code words.

14. The method of claim 1, wherein one or more of the graphical code words are non-information-encoding and the remaining graphical code words are information-encoding.

15. The method of claim 14, wherein information-encoding graphical code words and non-information encoding graphical code words are distinguishable on the basis of average gray value.

16. The method of claim 15, wherein information-encoding graphical code words have gray values within a selected gray value range.

17. The method of claim 14, wherein one or more non-information encoding graphical code words do not encode modulations into the graphical bar code during encoding.

18. The method of claim 14, wherein one or more non-information encoding graphical code words visually enhance regions of the graphical bar code when encoded.

19. A computer program for generating a graphical bar code, the computer program residing on a computer-readable medium and comprising computer-readable instructions for causing a computer to:

generate a sequence of graphical code words corresponding to a graphical encoding of a message;

halftone regions of an original image incorporating errors diffused among regions of the original image and computed based at least in part upon modulations in the graphical bar code corresponding to the graphical encoding of the message, wherein halftoning comprises generating regions of a base image based upon propagation of errors to corresponding regions of the original image; and modulate regions of the base image based upon the sequence of graphical code words to produce corresponding regions of the graphical bar code.

20. A method of decoding a graphical bar code, comprising:

generating a base image having halftoned regions of an original image incorporating diffused errors computed based at least in part upon modulations in the graphical bar code;

graphically demodulating the graphical bar code based on the base image to recover graphical code words embedded in the graphical bar code;

probabilistically comparing the recovered graphical code words to a set of graphical code words to obtain a sequence of graphical code words corresponding to a graphical encoding of a message; and decoding the sequence of graphical code words to produce a decoded message.

21. The method of claim 20, wherein the diffused errors are invariant to the graphically encoded message.

22. The method of claim 20, wherein the base image is generated without foreknowledge of the original image.

23. A method of decoding a graphical bar code, comprising:

generating a base image having halftone regions representative of an original image, wherein the base image is generated without foreknowledge of the original image and generating the base image comprises measuring one or more intrinsic features of the graphical bar code, and based upon the intrinsic feature measurements, selecting a sequence of halftone regions from a preselected set of halftone regions permitted to represent regions of the original image;

probabilistically comparing regions of the base image to a set of graphical code words to obtain a sequence of graphical code words corresponding to a graphical encoding of a message; and decoding the sequence of graphical code words to produce a decoded message.

24. The method of claim 23, wherein selecting the sequence of representative halftone regions comprises selecting a representative halftone region for each region of the graphical bar code likely to match a corresponding region of the base image.

25. A computer program for decoding a graphical bar code, the computer program residing on a computer-readable medium and comprising computer-readable instructions for causing a computer to:

generate a base image having halftoned regions of an original image incorporating diffused errors computed based at least in part upon modulations in the graphical bar code;

graphically demodulate the graphical bar code based on the base image to recover graphical code words embedded in the graphical bar code;

probabilistically compare the recovered graphical code words to a set of graphical code words to obtain a sequence of graphical code words corresponding to a graphical encoding of a message; and decode the sequence of graphical code words to produce a decoded message.

26. The method of claim 25, wherein the diffused errors are invariant to the graphically encoded message.

* * * * *